US007003767B2

(12) United States Patent
Larkin (10) Patent No.: US 7,003,767 B2
(45) Date of Patent: Feb. 21, 2006

(54) SYSTEM AND METHOD FOR REMOTELY UPDATING SOFTWARE APPLICATIONS

(75) Inventor: Michael K. Larkin, San Jose, CA (US)

(73) Assignee: International Business Machines Corp., Armonk, NY (US)

( * ) Notice: Subject to any disclaimer, the term of this patent is extended or adjusted under 35 U.S.C. 154(b) by 762 days.

(21) Appl. No.: 09/969,286

(22) Filed: Oct. 2, 2001

(65) Prior Publication Data

US 2003/0066065 A1    Apr. 3, 2003

(51) Int. Cl.
*G06F 9/44* (2006.01)
(52) U.S. Cl. .................... 717/172; 717/169; 717/175; 717/178
(58) Field of Classification Search ......... 717/168–178
See application file for complete search history.

(56) References Cited

U.S. PATENT DOCUMENTS

| | | | |
|---|---|---|---|
| 5,920,725 A | 7/1999 | Ma et al. ................. | 395/712 |
| 5,923,885 A * | 7/1999 | Johnson et al. ............ | 717/176 |
| 6,003,065 A | 12/1999 | Yan et al. ................. | 709/201 |
| 6,035,423 A * | 3/2000 | Hodges et al. ............. | 714/38 |

OTHER PUBLICATIONS

Jing et al., "Client-Server Computing in Mobile Environments", ACM, pp. 117-157, Jun. 1999.*
Hauswirth et al., "A Component and Communication Model for Push Systems", ACM, pp.: 20-38, Oct. 1999.*

* cited by examiner

*Primary Examiner*—Ted T. Vo
(74) *Attorney, Agent, or Firm*—Kunzler & Associates (57) ABSTRACT

A system and method are disclosed for remotely updating a software application on both thin client and non-thin client workstations while the software application is open on the client workstation. The system includes a server-side module and a client-side module. The method involves the server receiving the new software application and then either automatically pushing it onto each client or receiving a request from a registered client to have the new software program installed. The state of the user's application may optionally be saved during the install and restored after the automatic upgrading and installing of the segment of the software application. After the new software application has been successfully installed, the cache from the previous application is invalidated. Control is then transferred back to the client.

29 Claims, 6 Drawing Sheets

SYSTEM AND METHOD FOR REMOTELY UPDATING SOFTWARE APPLICATIONS

BACKGROUND OF THE INVENTION

1. The Field of the Invention

The present invention relates to systems and methods for upgrading software in distributed computer systems. More specifically, the present invention relates to systems and methods for automatically updating software across a network.

2. The Relevant Art

Large entities such as businesses and educational institutions often connect user computer stations with a network which is in turn connected to a local server. This allows users of the computer stations to share files, programs, software, and the like. Under this arrangement, a network administrator may centrally install and manage software applications on the server to allow each station that is connected to the server to access the software application from the server. This arrangement relieves the network administrator of having to download the new software application onto each individual computer. The stations running the software application remotely from the server are referred to as thin clients. Thin clients generally store user data centrally on the server and store little or no application code and data locally. Non-thin clients, on the other hand, generally run the entire application and store all data locally.

When managing distributed client environments, system administrators are often required to centrally manage software deployment. With thin clients, updated versions of software are easily updated and made available to the client upon the next reuse. The application is generally updated directly on the server, typically by installing the new version upgrade from a CD-ROM or by download from a specific location on the Internet or other network. Portions of the application that reside on the client can be downloaded from the server or otherwise installed while the application is not in use. With non-thin clients, the administrator is generally required to install the updated version of an application manually on each client station. This typically disrupts the work of many users for sustained periods of time. Even if conducted at night, software installations can be troublesome, as many users keep applications open when not at their desks, which can prevent upgrades from being successfully conducted.

Keeping the versions of the application straight in networks that have both thin clients and non-thin clients can also be quite troublesome. As is often the case, when a new version of software is developed, the system administrator must distribute the new version or otherwise verify that each client on the same network has the new version.

Computer systems operating in a distributed environment may access and install new versions of software using one of two methods. In a "pull" method, the client requests the new software from the server. In a "push" method, the server decides when to install the software and may install the software automatically onto the client.

The downtime that is involved with installing new versions of software onto remote clients can create problems. With either thin clients or non-thin clients, once installation of the new software is completed, the application may need to be restarted on the client and possibly even the entire workstation may have to be restarted before the new version of the software application is accessible. When a new version of a software application is pushed upon the client while the software application is executing, the user is likely to temporarily or permanently lose data. Even when users are alerted and save their data, work is interrupted, and after the installation of the software application update, the user is generally required to restart the application, and in some cases the entire machine. The user is thus left waiting while the machine reboots, the application restarts, the installation process is completed, and the document is found again and reopened.

Providing the client with the new version of a software application is also burdensome on system administrators. For example, when a new or updated version of an application is available for download from the Internet, the system administrator is typically required to verify that each thin client is aware of the updated version of the application and to verify that the updated version is properly installed on each thin client. For non-thin clients, the system administrator must assure that each non-thin client has the updated version of the application by installing the new version one machine at a time. Thus, the system administrator often finds him or herself charged with managing both thin and non-thin clients. Since most users of non-thin clients either administer their own machines or retain the services of a separate group to manage their environments, a method is needed to deploy and synchronize software packages for these users.

In accordance with the above discussion, it should be readily appreciated that a need exists for a system and method to automatically update and synchronize versions of software applications in both non-thin and thin client environments. What is similarly needed is a manner of allowing users of both thin and non-thin clients to avoid having to restart application and/or the entire workstation once the new version of the application is downloaded and installed.

OBJECTS AND BRIEF SUMMARY OF THE INVENTION

The present invention has been developed in response to the present state of the art, and in particular, in response to the problems and needs in the art that have not yet been fully solved by currently available programs. Accordingly, the present invention solves the foregoing problems by providing a system and a method for remotely updating and synchronizing a software application within both thin and non-thin client workstations and for restoring the software application to a useable state without restarting the software application.

In one aspect of the invention, the server is configured to automatically upgrade or update and push each new version of an application onto the thin client. The thin client may be configured to register with the server for push-type updates, making the server aware of the client's location.

The server may be configured to monitor a remote system that may contain a catalog of available updates to determine whether new versions of an application are available for download to the client. When new versions of the application are available, the server may automatically initiate the installation of the software application updates. Alternatively, the clients, either automatically or in response to a user, may request a pull-type installation of new software application or new software application updates.

In both push and pull cases, the server contacts the client and prepares to install the application update. The user may have the application open-that is, executing or otherwise in an operational state—when the server attempts to push the new application onto the client. An option may be provided to save the current state of the client's target software application. If the option is selected, the system determines that the current state is persistent and selects where the state will be stored, i.e., on the server, locally, on a diskette, etc.

In one embodiment, the client state is transmitted from the client to the server to be stored on the server temporarily during the upgrading of the application onto the client. The server, accordingly, receives the current state from the client and stores it in a designated location.

Upon storing the current state on the server, the updated version of the application is pushed onto the client. In addition, in one embodiment, once the client has received the updated version, it invalidates the application cache from the previous version of the application.

The current state stored on the server is then pushed back onto the client and control is returned to the client. The client may then reconcile any data version changes from the previous version of the application and the newly downloaded version.

In one embodiment the user is presented with the option of resuming with the state that was open at the time of the push, restarting the application, and/or restarting the entire client workstation. New application installation may also be conducted using the system and method of the present invention.

The server may thus update both thin and non-thin clients automatically and remotely when the server becomes aware of new versions of the software application. The update process may also be transparent to the client, making the updated version available with minimal or no disruption to the user of the client.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, may be arranged and designed in a wide variety of different configurations. Thus, the following more detailed description of the embodiments of the system, and method of the present invention, as represented in the figures, is not intended to limit the scope of the invention, as claimed, but is merely representative of presently preferred embodiments of the invention.

Figure 1:
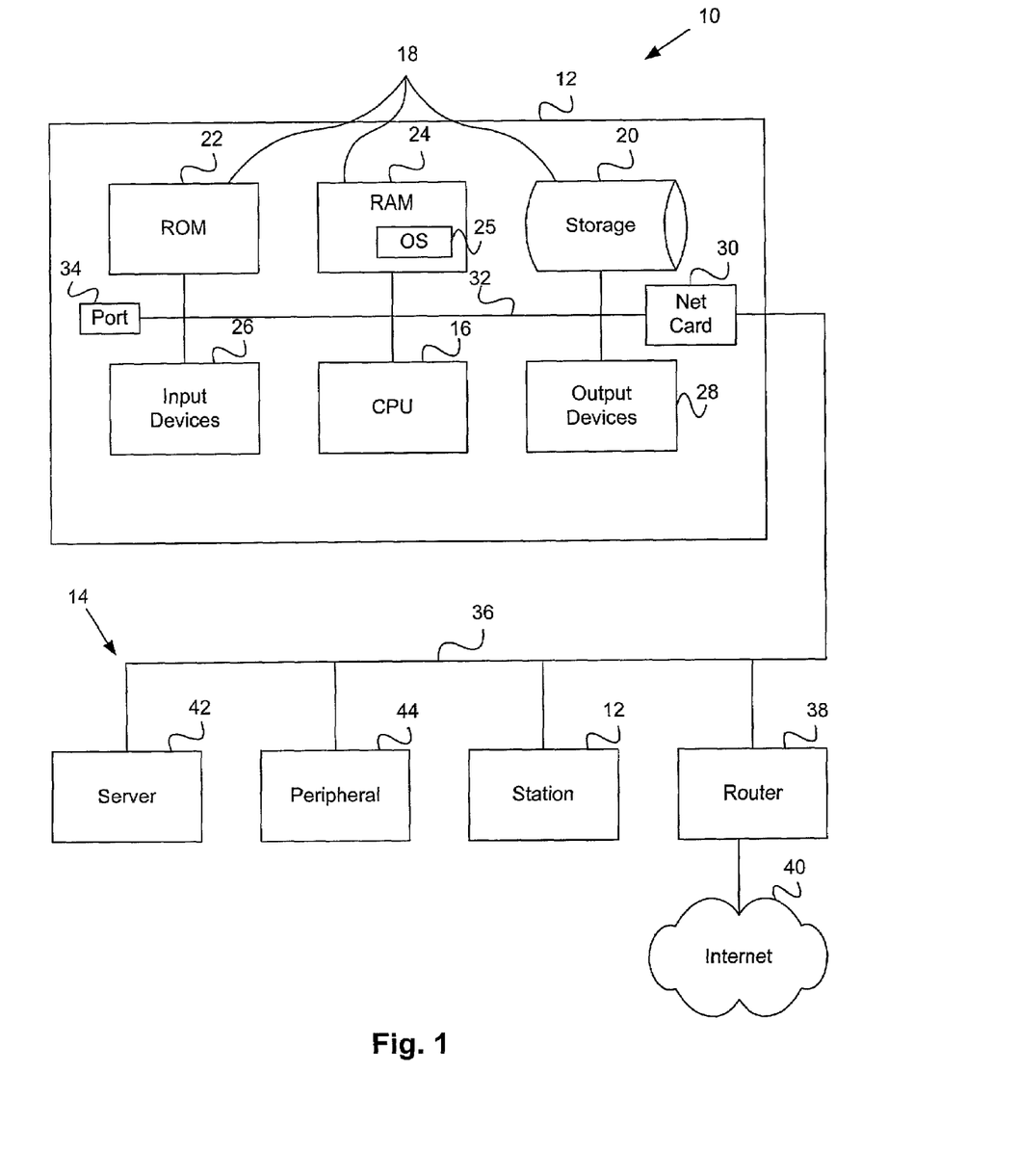
FIG. 1 is a schematic block diagram illustrating a computer system suitable for implementing the software update system and method of the present invention.

FIG. 1 is a schematic block diagram illustrating one example of a computer system 10 suitable for employing the system and method of the present invention. In FIG. 1, one or more computer stations 12 may be hosted on a network 14. Typical networks 14 generally comprise wide area networks (WANs), local networks (LANs) or interconnected systems of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 of system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and ratio frequencies may be implemented as appropriate.

In general, the network 14 may comprise a single local area network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network. In the case of the Internet, a single, layered communications protocol (TCP/IP) generally enables communication between the differing networks 14 and stations 12. Thus, a communication link may exist, in general, between any of the stations 12.

In addition to the stations 12, other devices may be connected on the network 14. These devices may include application servers 42, and other resources or peripherals 44, such as printers and scanners. Other networks may be in communication with the network 14 through a router 38 and/or over the Internet.

Figure 2:
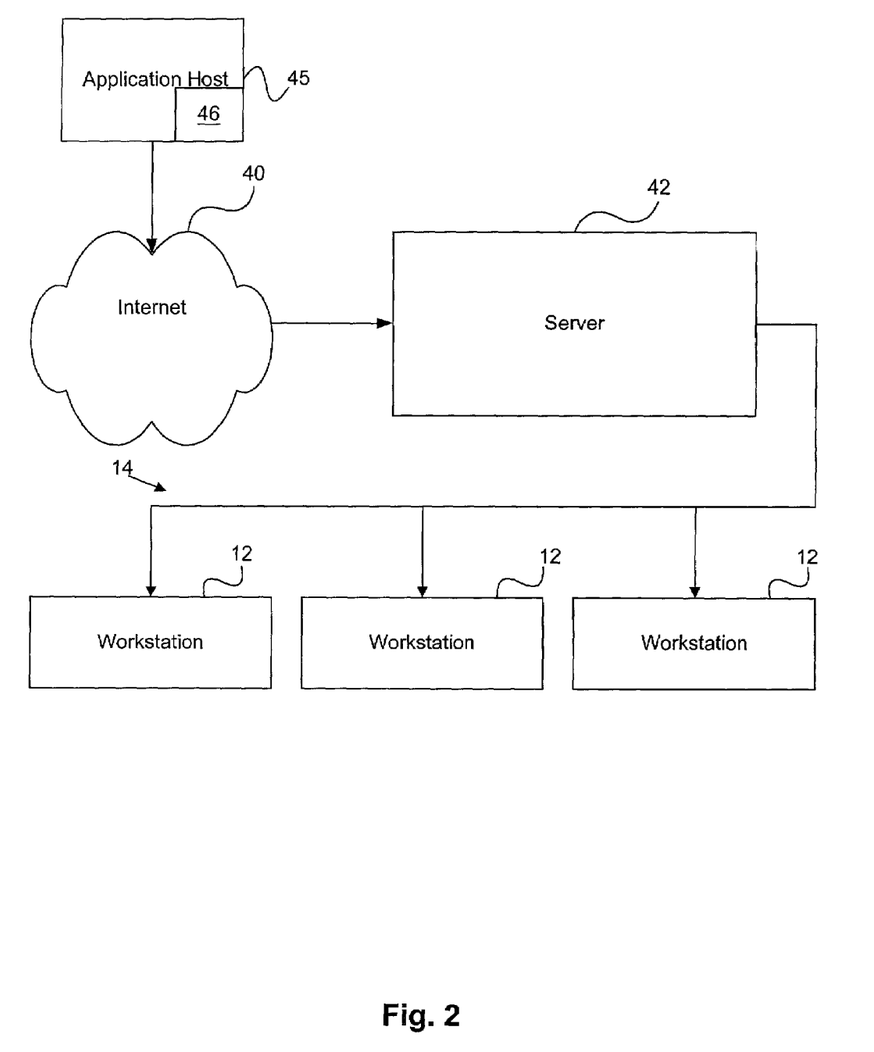
FIG. 2 is a schematic block diagram illustrating one embodiment of a system for upgrading a new application to a newer version over a network.

Referring now to FIG. 2, a schematic block diagram of one example of an environment for implementing the present invention is shown including a plurality of workstations 12. In one embodiment, the workstations 12 are connected via a network 14 which operates in conjunction with a server 42. The server 42 is connected to the Internet 40, where a site 45 hosting an application 46 is located. In one embodiment, the application is a Java™ based application, but the present invention is intended for use with any suitable type of application.

Figure 3:
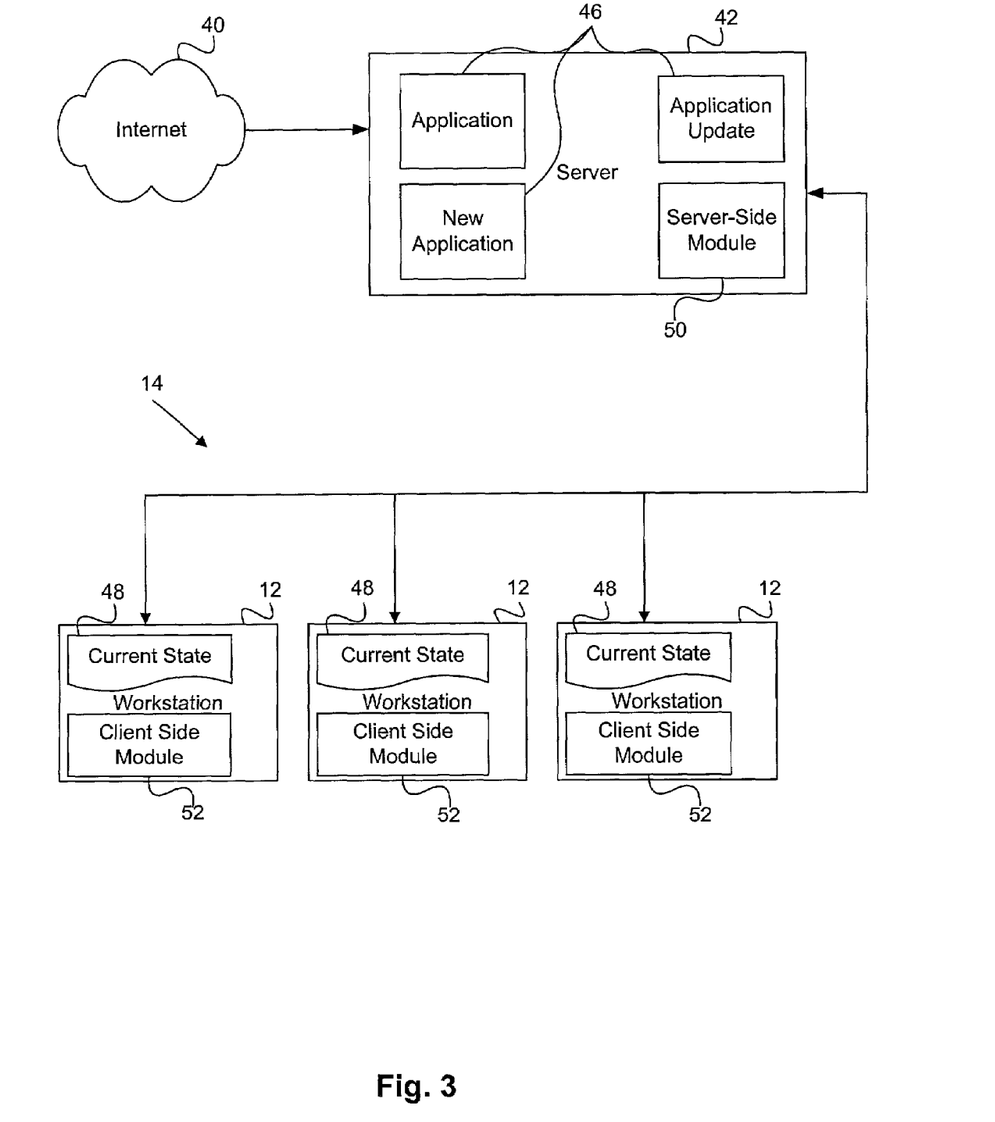
FIG. 3 is a schematic block diagram illustrating a new application being transferred to a server, a current state of the workstation, and embodiments of both a client-side module and server-side module.

Referring now to FIG. 3, under one embodiment of the present invention, the server 42 monitors the application host 45 (of FIG. 2) for notification of any updates to the application 46. When such notice is received, the updated version of the application 46 is downloaded across the Internet 40 or other suitable communication medium to the server 42. The reception of the notice and the downloading of the updates are preferably conducted automatically, but may also be conducted manually. The server 42 is preferably configured to store the application update and to automatically push the updated version of the application 46 onto registered workstations 12 using a server-side update module 50. The updated version of the application 46 may also be downloaded and/or transmitted to the stations 12 upon request of the stations 12. The current state 48 of the workstations 12 may be temporarily stored on the server 42 during the upgrading of the application 46, and then later restored, as will be discussed.

Figure 4:
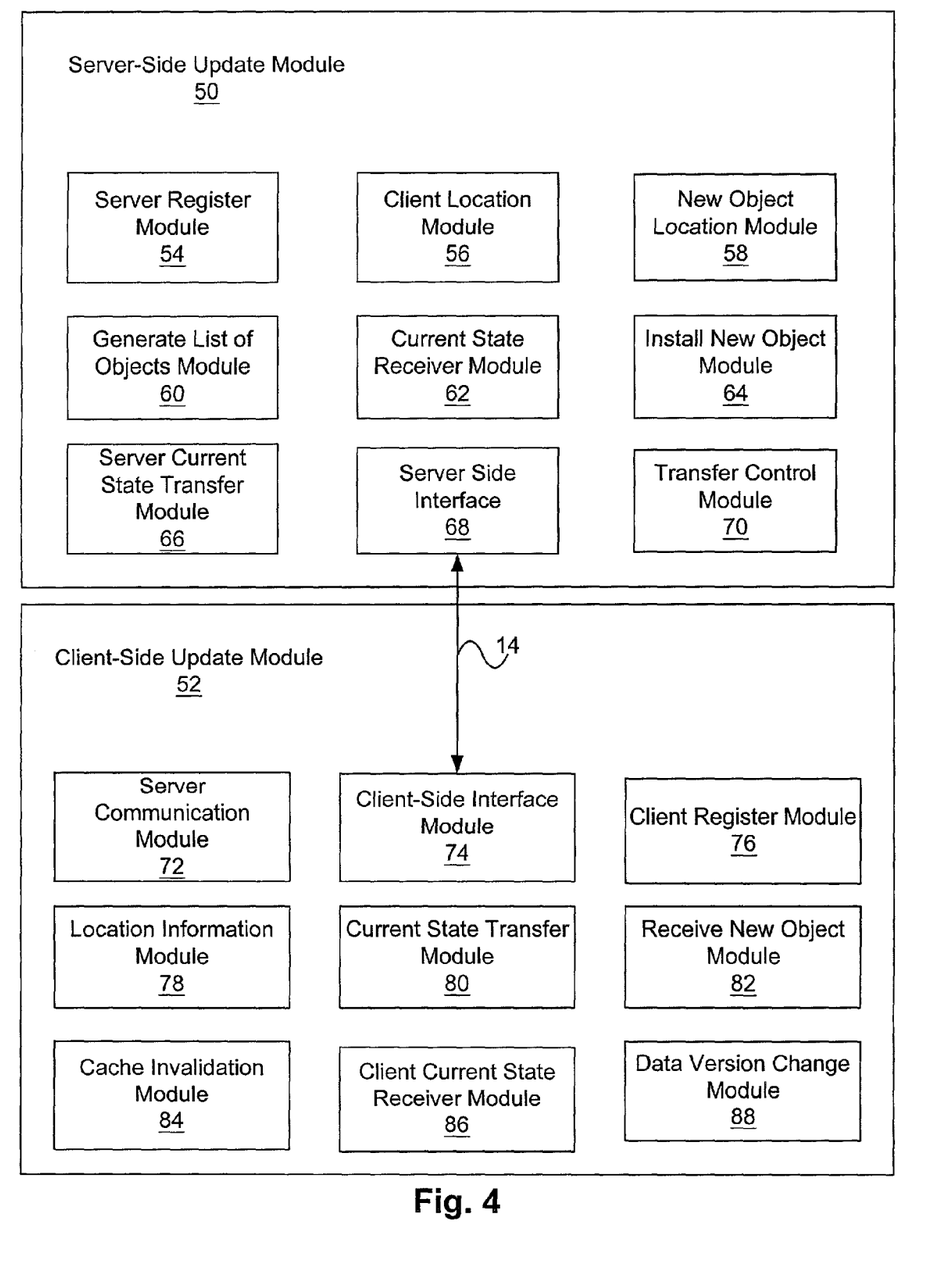
FIG. 4 is a schematic block diagram illustrating one embodiment of the client-side module and the server-side module of FIG. 3.

FIG. 4 illustrates one embodiment of the server-side update module 50 and the client-side update module 52 of FIG. 3. Within the server-side update module 50 are shown a server register module 54, a client location module 56, anew object location module 58, a generate list of objects module 60, a current state receiver module 62, an install new object module 64, a server current state transfer module 66, a server-side interface 68, and a transfer control module 70. In the depicted embodiment, the server-side interface 68 is configured to connect with the client-side update module 52 through a network connection 14.

The client-side update module 52 is shown provided with a server communication module 72, a client-side interface 74, a client register module 76, a location information module 78, a client current state transfer module 80, a receive new object module 82, a invalidate cache module 84, a client current state receiver module 86, and a data version changes module 88. In the depicted embodiment, the client-side interface 74 is configured to connect with the server-side update module 50 through a network connection 14.

The server communication module 72 is preferably configured to communicate with the server 42 (of FIG. 2) to receive any updates that may be available to the system. In the case of the client "pulling" the update, the client register module 76 is configured to register the client for available updates. The server register module 54 is preferably configured to record client registration.

The location information module 78 is preferably configured to inform the server 42 of clients' location. The client location module 56 is preferably configured to generate a list of all registered clients in which the updated version of the application 46 of FIG. 3 is to be distributed to and to record the location of each of the registered clients. The new object location module 58 is preferably configured to identify any new updates that may be available to distribute to the client workstation 12 of FIG. 3 and also to the server 42 of FIG. 3. The generate list of objects module 60 is preferably configured to generate a list of objects that are available to download onto both thin and non-thin clients.

The client-side module 52 preferably consists of an optional current state transfer module 80 that is configured to transfer the current state 48 of the client of FIG. 3 to the server 42 for storage. The current state receiver module 62 is preferably configured to receive and store the current state 48 of the client for later restoration. The current state 48 is stored until the updated version of the application 46 is upgraded on the workstations 12. The upgrading of the application 46 of FIG. 3 is preferably conducted with an install new object module 64 which is configured to install the new application 46 on the registered clients. The receive new object module 82 is preferably configured to receive information from the install new object module 64 for use in installing application updates 47 on the client workstations 12.

In one embodiment, upon receiving the application update 47, the client-side update module 52 invalidates the cache from the previous version of the application that is replaced by the updated version of the application 46. This process may be conducted by a cache invalidation module 84. After invalidating the cache, the client-side update module 52 receives the current state 48 that was temporarily stored on the server 42, preferably with a current state transfer module 66. The current state 48 is then received by the client current state receiver module 86 and made accessible to the user of the workstation 12 having the newly updated application 46 implemented. Upon receiving the current state 48, the data version change module 88 within the client-side module 52 may be configured to modify the current state 48 to match the updates and possible changes brought about from the updated version of the application 46 that was recently implemented on the workstation 12. The transfer control module 70 within the server-side module 50 is configured to then pass control back to client module to allow the user to continue use of the workstation 12.

Figure 5:
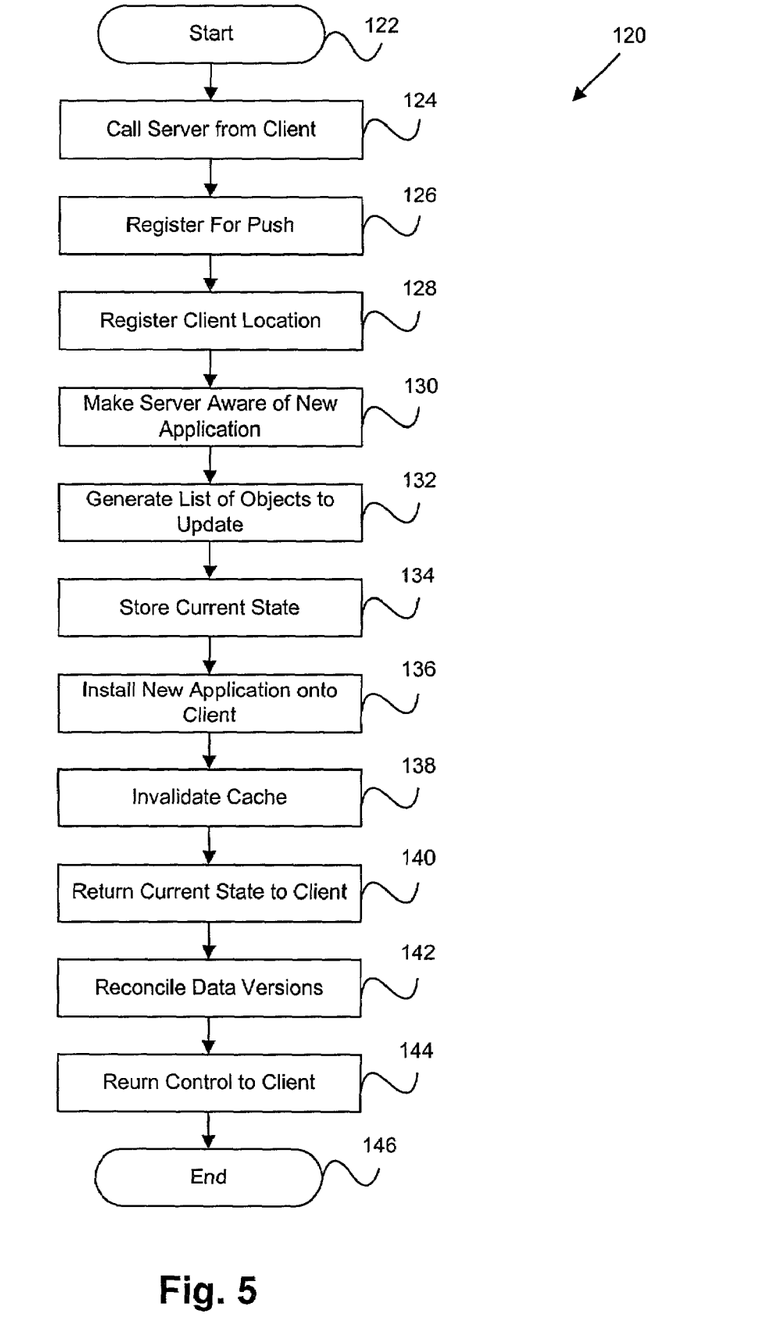
FIG. 5 is a flow chart block diagram illustrating one embodiment of a push method of the present invention for remotely updating software applications.

FIG. 5 is a schematic flow chart diagram illustrating one embodiment of a push-type method 120 of upgrading and installing new versions of a software application. The method 120 begins at a start step 122 and progresses to step 124. At step 124, the client, which may comprise the workstation 12 of FIG. 1, calls a server such as the server 42 of FIG. 2. During this call, and as indicated at a step 126, the client registers to have the updated version of the software application 46 be pushed onto the client, preferably into the RAM memory 24 of FIG. 1. In a step 128, the location of the client is registered with the server 42.

At a step 130, the server 42 of FIG. 2 determines the availability of an updated version of the software application 46. The updated version 46 may, for example, be located on the Internet 40 or stored on the ROM 22 of FIG. 1. The determination of step 130 may be accomplished by the server 42 monitoring a site such as a catalog server of a software vendor for the appearance of newer versions of the software application 46. In addition, a vendor of the software application 46 may periodically notify its customers of new versions of its software application 46. In doing so, it preferably communicates directly with the server 42.

At a step 132, the server 42 generates a list of the workstations 12 that are registered to be updated with the updated version of the software application 46. The updated version of the software application is then automatically loaded and installed on these workstations 12. Below, the update process will be described for a single workstation 12, but it should be appreciated that the server 42 is preferably configured to update all workstations 12 on which the software application 46 to be updated is installed.

At a step 134, the current client state 48 of the workstation 12 is stored temporarily during the upgrading of the software application 46. The client state 48 may be stored on the server 42, or may be stored locally on non-volatile memory 20 of the client 12. In one embodiment, the client state 48 comprises preferences and active data of the client for the software application that are stored in RAM memory 24. Data of the software application 46 in RAM memory 24, as well as in persistent memory at the time of the update may also be stored in a like manner. Because the client state 48 is saved, the updating process may be conducted while the client computer is in operation, and indeed, while the target software application is open. The term "open" as used herein is intended to mean a state of current execution of the software application, including being actively used by a user and/or merely operating passively in the background.

In a step 136, the software application update 46 is pushed upon the registered workstation 12. Many applications, particularly Java applications, may have an application cache that must be invalidated in order to successfully update the application. Accordingly, in one embodiment, at a step 138, the application cache from the previous version of the software application is invalidated and flushed. In Java applications, an application's objects are tied to the class definition loaded by a class loader. The class loader houses the application class. In one embodiment, in order to clear or "invalidate" the application cache, a new class loader is created, forcing the old class loader's cache to be "forgotten." That is, the old class loader is disassociated with the software application and the previously occupied memory may then be automatically reclaimed by a utility such as Java's system garbage collector.

The new class loader may be created in one embodiment by a) creating a new instance of an upgradable software component (object); b) working with this instance for a period of time until a new version becomes available; c) defining and instantiating a new class loader (or instantiating a class loader derived from the system class loader); d) instantiating anew version of the software component using the new class-loader; e) casting the new version of the component to an identical interface accessible by both class loaders; and f) assigning the casted component to the handle of the original object.

At a step 140, the current state 48 is passed from the server back to the registered workstation 12. In a step 142, any data version changes from the newly downloaded software application 46 are reconciled. As an example of reconciling data, consider an instance in which an updated version of the application 46 that may be a word processor makes a bold lettering option unavailable. In this example, active data of the current state that are configured with bold lettering are modified. That is, the bold lettering is automatically changed to a default command such as underlining or plain text when the current state is passed back to the client. In a step 144, control is passed back to the workstation 12, and the newly downloaded software application 46 can be accessed without having to reboot the workstation 12 or the application 46.

Figure 6:
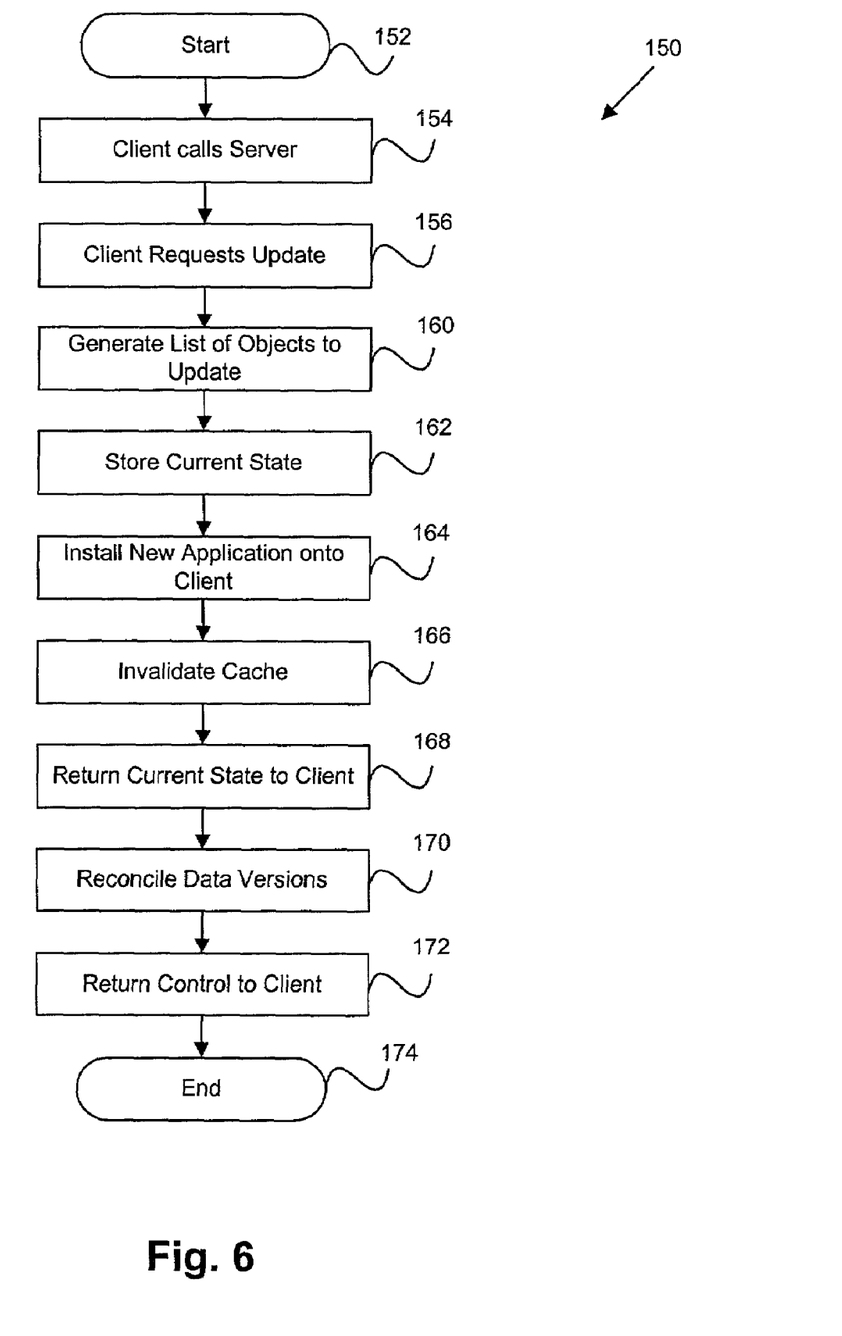
FIG. 6 is a flow chart block diagram illustrating one embodiment of a pull method of the present invention for remotely updating software applications.

FIG. 6 is a schematic flow chart diagram illustrating one embodiment of a pull-type method 150 of automatically upgrading and installing new versions of a software application. The method 150 begins at a start step 152 and progresses to step 154. At step 154, the client, such as the workstation 12 of FIG. 1 calls a server, which may comprise the server 42 of FIG. 2. During the call, the client then requests an update of the software application 46, as indicated at a step 156.

At a step 160, a list of objects or components of the software application 46 that are to be updated is generated. The server preferably compiles the list in response to the version of the update requested by the client. At a step 162, the current state 48 of a client 12 is stored temporarily during the upgrading or updating of the software application 46, as discussed for step 134. In a step 164, the software application update 46 is automatically transmitted to and installed upon the client 12. After the software application update 46 has been automatically loaded and installed on the client 12, the application cache from the previous version of the software application is preferably invalidated substantially in the manner described above with respect to step 138 of FIG. 5.

At a step 168, the current state 48 is returned to the client. The current state 48 is thus either returned from the server 42, or is retrieved from non-volatile storage 20 of the client 12. In a step 170, the data version changes from the newly downloaded software application 46 are reconciled, as discussed above for step 142. In a step 172 control is passed back to the client, and the newly downloaded software application 46 is made available for access by a user without having to reboot the workstation 12 or the application 46.

The present invention has been described above with respect to the automatic loading and installing of an updated version of the currently installed application on the clients. The present invention similarly may be used to install new applications onto the clients 12. Preferably, in so doing, the state of the client is stored during the installation process and restored once the installation is complete. In one embodiment, a "dummy" application that is completely devoid of program code or data is preinstalled on the client workstation. The dummy application is provided with the lowest possible versioning criteria for the target domain. The dummy package is then used as a basis for installing the software application as if it were being merely updated in the manner discussed above. In so doing, the state of the software application, and the entire client if necessary, is preferably stored during the updating process and restored at the termination thereof in the described manner.

As can be seen from the above discussion, the present invention allows new software applications or upgrades of software applications to be downloaded remotely onto both thin and non-thin clients, and even on distributed computer systems with both thin and non-thin clients. In one aspect, the server is configured to automatically download the new software application or the updated version of an existing application. In other embodiments, the thin client may be configured to register for a pull of the new software application. This allows for the updating and downloading and installing of new software applications on both thin and non-thin clients.

The present invention also allows the current state of the client to be stored temporarily during the updating and downloading of the software application. Once the software application has been upgraded, the present invention allows the user to resume work on the current state without having to restart application and/or entire workstation. Downtime due to restarting is therefore greatly reduced.

The present invention is claimed and described herein in terms of "modules" or "subsystems." As used herein, these terms are used to refer to lines of software code instructions or to electronic hardware configured to achieve the given purpose of the module. As such, a module or subsystem is a structural element. As will be readily understood to one skilled in the art of software development, more than one instruction may exist within a module or subsystem. The instructions may not necessarily be located contiguously, and could be spread out among various different portions of one or more software programs, including within different objects, routines, functions, and the like. Similarly, the hardware components of a subsystem or module, such as integrated circuits, logic gates, discrete devices, and the like, need not be organized into a single circuit, but could be distributed among one or more circuits. Unless stated otherwise, hardware or software implementations may be used interchangeably to achieve the structure and function of the disclosed modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of remotely installing and automatically updating software applications, the method comprising:
    automatically installing a segment of a software application from a remote station while the software application is in an open state on a client;
    transmitting a current state from the client to the remote station for preservation during the installation of the software application;
    returning the current state to the client; and
    automatically restoring the software application to the open state after installing the segment of the software application.

2. The method of claim 1, wherein the software application is programmed in a high level application.

3. The method of claim 1, wherein automatically installing a segment of a software application is conducted without restarting the software application.

4. The method of claim 1, wherein the remote station is a server.

5. The method of claim 1, further comprising providing a user with an option of automatically installing a segment of a software application on one of a thin client workstation and a non-thin client workstation.

6. The method of claim 1, further comprising calling the remote station from the client and registering for a push to make the remote station aware of the client's location on a network.

7. The method of claim 1, further comprising determining at the remote station that a new version of the software application is available.

8. The method of claim 1, wherein the segment of a software application is a new version update and further comprising generating a list of at least one object to update and push upon the client from the remote station.

9. The method of claim 8, further comprising providing a client update module resident on the client, the client update module configured to receive the update object from the remote station.

10. The method of claim 1, further comprising determining whether the current state is persistent and where the current state is to be stored in response to receiving the update object.

11. The method of claim 1, wherein the software application comprises an application cache, the application cache storing parameters and characteristics of the software application.

12. The method of claim 11, further comprising invalidating the application cache of the software application.

13. The method of claim 1, further comprising reconciling data version changes present in the current state.

14. The method of claim 1, further comprising restoring control to the client after installing the segment of an application and allowing the client to resume work without restarting the application.

15. A method of remotely updating a software application from a remote station while the software application is open on a client, the method comprising:
    providing an option of automatically upgrading and installing an update to an application on one of a thin client workstation and a non-thin client workstation;
    calling the remote server from the client and registering for a push such that the remote server becomes aware of the clients' location;
    recognizing at the remote server that a new version of the software application is available;
    generating a list of at least one object to update and push upon the client from the remote server;
    transmitting the current state to the remote server for preservation during the installing of the segment of a software application;
    invalidating an application cache of the software application;
    automatically installing the at least one update object from a remote server while the software application is open on a client;
    returning the current state to the client; and
    restoring control to a client without restarting the application and without restarting the client workstation.

16. A system for remotely installing and automatically updating software programs, the system comprising:
    a server-side update module configured to automatically install a segment of a software application; and
    a client-side update module located remote to the server-side update module across a network and configured to restore the current state of the application after installation of segment of the software application has been executed and further comprising a current state transfer module configured to determine whether the current state is persistent and to transfer the current state to the server to be temporarily stored.

17. The system of claim 16, wherein the software program is programmed in a high level application.

18. The system of claim 16, further comprising a client-side update module configured to provide a user with an option of automatically upgrading and installing a segment of an application on one of a thin-client and a non-thin client workstation.

19. The system of claim 18, further comprising a server communication module configured to call the server-side update module from a client-side update module and register for a push to make the server-side module aware of the clients' location on a network.

20. The system of claim 16, wherein the server-side update module is configured to become aware of any newer versions of the software applications which are available and automatically install the newer versions on remote clients.

21. The system of claim 16, wherein the server-side update module further comprises a current state receiver module, the current state receiver module configured to receive and temporarily store a current state sent from the current state transfer module.

22. The system of claim 21, further comprising a current state transfer module configured to transfer a current state back to the client-side module.

23. The system of claim 22, wherein the client-side update module is configured to receive the current state from the current state transfer module.

24. The system of claim 16, wherein the server-side update module further comprises a:
   new object installation module, the new object installation module configured to update and push the segment of the software application upon the client-side update module.

25. The system of claim 16, wherein the client-side module further comprises a new object receipt module, the new object receipt module configured to allow the segment of the software application to be installed on the client.

26. The system of claim 25, further comprising a cache invalidation module configured to invalidate an application cache of the software application.

27. The system of claim 16, wherein the client-side update module is configured to correct invalid fields in the current state after installation of the segment of a software application.

28. The system of claim 16, wherein the server-side update module is configured to transfer control back to client-side update module after installing the segment of an application and to allow the client to resume the application without restarting the application.

29. A method of remotely installing and software applications, the method comprising:
   automatically installing a software application from a remote station while the software application is in an open state on a client;
   transmitting a current state from the client to the remote station for preservation during the installation of the software application;
   returning the current state to the client; and
   automatically placing the software application in the open state after installing the software application.

* * * * *